A. W. HOYT.
Gang-Plow.
No. 131,218.   Patented Sep. 10, 1872.
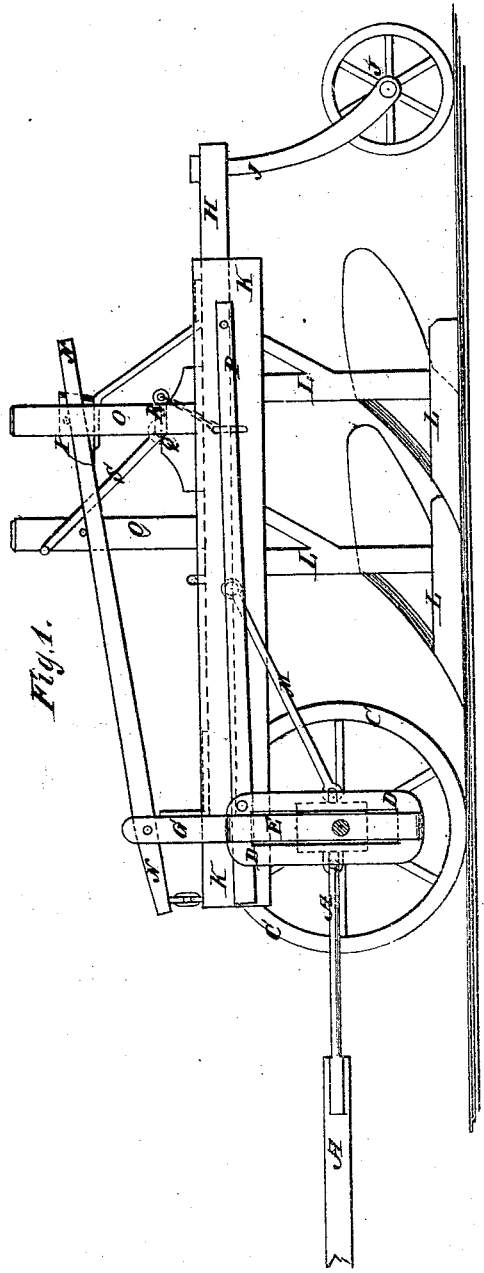
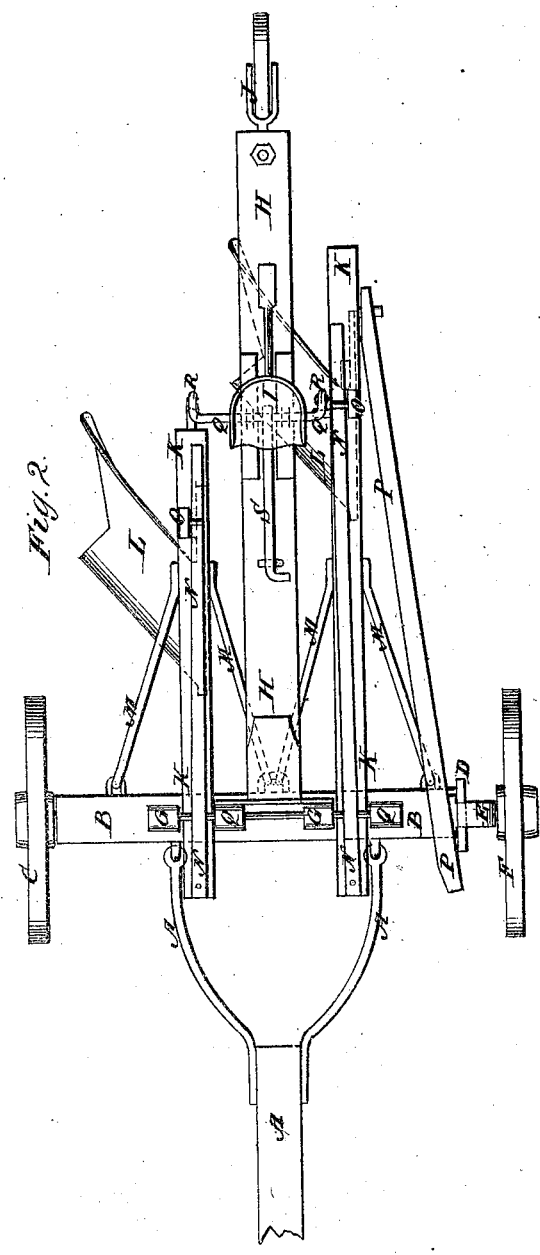

UNITED STATES PATENT OFFICE.

ALBERTUS W. HOYT, OF DENVER, ILLINOIS.

IMPROVEMENT IN GANG-PLOWS.

Specification forming part of Letters Patent No. 131,218, dated September 10, 1872.

Specification describing a new and useful Improvement in Gang-Plow, invented by ALBERTUS W. HOYT, of Denver, in the county of Hancock and State of Illinois.

Figure is a side view of my improved plow, one wheel being removed. Fig. 2 is a top view of the same.

Similar letters of reference indicate corresponding parts.

My invention has for its object to furnish an improved gang-plow, simple in construction, inexpensive in manufacture, convenient in use, effective in operation, and easily adjusted and controlled; and it consists in the construction and combination of various parts, as hereinafter more fully described.

A is the tongue to which the draft is applied and which is attached to the axle B, upon one end of which is formed, or to it is attached, a journal for the wheel C. Upon the other end of the axle B is formed a long vertical tenon which enters a vertical slot in the plate D, where it is secured in place by pins or other fastenings passing through the said tenon upon the outer side of said plate D. E is a bar placed directly opposite the slot in the plate D and parallel with said plate, and the ends of which are bent inward and rigidly attached to the ends of said plate D. The plate D and bar E may be formed in one piece if desired. To the bar E is attached the journal upon which the other wheel, F, revolves. By this construction the machine may be adjusted to run level by raising and lowering the plate and bar D E upon the end of the axle B. To the axle B are attached the lower ends of two pairs of uprights, G. To the two inner bars G is attached the forward end of the beam H, which forms the frame of the machine, to which the driver's seat I is attached, and the rear end of which is supported by a caster-wheel, J. K are the plow-beams, the forward ends of which are inserted between the uprights G, which keep them in vertical position and prevent lateral movement. The plows L are attached to the beams K, the one at a suitable distance in the rear of the other. The plows K L are drawn by the bars or rods M, the rear ends of which are pivoted to the opposite sides of the plow-beams K. The rods M of each beam incline from each other, and their forward ends are attached to the axle B. N are levers, the forward ends of which are connected with the forward ends of the plow-beams K. The levers N are pivoted to the upper ends of the upright G, and their rear ends extend back into such a position that they can be conveniently reached and operated by the driver from his seat to raise and lower the forward ends of the plow-beams K. The rear parts of the levers move up and down along the sides of standards O, attached to the rear part of the plow-beams K, so that the said levers may be secured in any desired position by pins inserted in holes in said standards, or by other convenient means. The device D E is raised and lowered to raise and lower the wheel F by the lever P, the forward end of which is connected with the end of the axle B. The lever P is pivoted to the upper end of the device or frame D E, and extends back into such a position that its rear end may be reached and operated by the driver from his seat I. The lever P passes along the side of the standard O, and may be secured in any position into which it may be adjusted by a pin inserted in holes in the standard O, or plow-beam K, or by other convenient means. To the beam H near the seat I is pivoted a short transverse shaft, Q, to the ends of which are attached, or upon them are formed, arms R, the outer ends of which are connected with the rear ends of the plow-beams K by short chains or other convenient connections. To the shaft Q is also attached a lever, S, which may be operated by the driver with his foot to raise the rear ends of the plow-beams from the ground. The lever S may be secured in position to hold the plows suspended by a catch attached to the beam H.

Having thus described my invention, I claim as new and desire to secure by Letters Patent—

The arrangement of the levers N, rock-shaft Q, arms R, and lever S, with respect to the plow-beams K, uprights G, and beam H, substantially as herein shown and described, and for the purpose set forth.

ALBERTUS W. HOYT.

Witnesses:
ISAAC L. SNYDER,
R. F. DEERING.